US009956928B2

(12) United States Patent
Hartwig et al.

(10) Patent No.: US 9,956,928 B2
(45) Date of Patent: May 1, 2018

(54) TRACK ASSEMBLY FOR SLIDING VEHICLE DOOR

(71) Applicants:Kenneth J Hartwig, Ortonville, MI (US); Timothy E Weeks, Washington, MI (US)

(72) Inventors: Kenneth J Hartwig, Ortonville, MI (US); Timothy E Weeks, Washington, MI (US)

(73) Assignee: FCA US LLC, Auburn Hills, MI (US)

( * ) Notice: Subject to any disclaimer, the term of this patent is extended or adjusted under 35 U.S.C. 154(b) by 17 days.

(21) Appl. No.: 14/755,898

(22) Filed: Jun. 30, 2015

(65) Prior Publication Data

US 2017/0005461 A1    Jan. 5, 2017

(51) Int. Cl.
*B60R 16/02* (2006.01)
*E06B 3/46* (2006.01)
*E05D 15/10* (2006.01)
*E05F 15/632* (2015.01)
*H02G 11/00* (2006.01)
(Continued)

(52) U.S. Cl.
CPC ........ *B60R 16/0207* (2013.01); *E05D 15/101* (2013.01); *E05F 15/632* (2015.01); *E06B 3/4636* (2013.01); *B60J 5/06* (2013.01); *E05D 11/0081* (2013.01); *E05D 2015/1055* (2013.01); *E05Y 2400/654* (2013.01);
(Continued)

(58) Field of Classification Search
CPC ............ B60R 16/0207; B60R 16/0215; B60R 16/0222; H01B 7/0045; B60J 5/06; E05D 15/0621; E05D 15/0652; E05D 15/101; E05F 11/54; E05F 15/632
See application file for complete search history.

(56) References Cited

U.S. PATENT DOCUMENTS 5,716,044 A    2/1998 Peterson et al.
6,174,020 B1    1/2001 Knettle et al.
(Continued)

FOREIGN PATENT DOCUMENTS

DE    10131950 A1    1/2002
EP    0135929 A2    4/1985
(Continued)

OTHER PUBLICATIONS

International Search Report and Written Opinion dated Sep. 20, 2016 for International Application No. PCT/US2016/031786, International Filing Date May 11, 2016.

*Primary Examiner* — Gregory J Strimbu
(74) *Attorney, Agent, or Firm* — Ralph E Smith

(57) ABSTRACT

A track assembly for a sliding vehicle door, which includes a wire track extending between a track mount assembly attached to the sliding vehicle door and a body mount component. The wire track comprises a plurality of interconnected links allowing the wire track to articulate in a wire track articulation plane between door closed and door open positions. A wiring harness extends through the wire track. An elastomeric grommet extends from the track mount assembly and surrounds the wiring harness while permitting the wiring harness to twist and bend inside the grommet as the wire track articulates. A roller track is mounted to a vehicle body structure. The body mount component is mounted below the roller track such that the wire track articulation plane is disposed below a lower wall of the roller track.

18 Claims, 6 Drawing Sheets

(51) Int. Cl.
  *B60J 5/06*      (2006.01)
  *E05D 11/00*    (2006.01)

(52) U.S. Cl.
  CPC ..... *E05Y 2600/46* (2013.01); *E05Y 2900/531* (2013.01); *H02G 11/003* (2013.01)

(56) References Cited

U.S. PATENT DOCUMENTS

| | | | |
|---|---|---|---|
| 6,550,232 B1 | 4/2003 | Achs et al. | |
| 6,781,058 B1 * | 8/2004 | DeCicco | B60J 5/06 174/135 |
| 7,082,720 B2 | 8/2006 | Kobayashi et al. | |
| 7,284,785 B2 * | 10/2007 | Gotou | H02G 3/0475 174/72 A |
| 7,325,361 B2 * | 2/2008 | Rogers, Jr. | E05F 15/643 296/155 |
| 8,468,748 B2 | 6/2013 | Wehler | |
| 8,544,936 B2 * | 10/2013 | Lindner | B60R 16/027 296/155 |
| 2002/0068486 A1 * | 6/2002 | Kafer | B60R 16/0215 439/625 |
| 2002/0112320 A1 | 8/2002 | Hayashi | |
| 2003/0061680 A1 * | 4/2003 | Uchida | B60R 16/0222 16/2.1 |
| 2007/0084619 A1 * | 4/2007 | Kisu | B60R 16/0215 174/72 A |
| 2009/0121093 A1 * | 5/2009 | Murayama | B60R 16/0215 248/70 |
| 2009/0140107 A1 * | 6/2009 | Murayama | B60R 16/0215 248/60 |
| 2010/0018766 A1 * | 1/2010 | Shimonishi | B60R 16/0215 174/72 C |
| 2010/0263926 A1 * | 10/2010 | Murayama | B60R 16/0207 174/71 R |
| 2014/0238740 A1 | 8/2014 | Inoue et al. | |
| 2016/0207480 A1 * | 7/2016 | Sekino | B60R 16/03 |

FOREIGN PATENT DOCUMENTS

| | | |
|---|---|---|
| EP | 0173829 A2 | 3/1986 |
| EP | 1602518 A2 | 12/2005 |
| JP | 2002-315168 | * 10/2002 |
| JP | 2010-215010 | * 9/2010 |
| WO | 95/02108 A1 | 1/1995 |
| WO | WO 2016/021081 | * 2/2016 |

\* cited by examiner

TRACK ASSEMBLY FOR SLIDING VEHICLE DOOR

FIELD

The subject disclosure generally relates to track assemblies for sliding vehicle doors, including those with wire tracks housing and protecting a wiring harness that provides electrical power to the sliding vehicle door.

BACKGROUND

This section provides background information related to the present disclosure which is not necessarily prior art.

Common to some vans and mini-vans is the use of a rear sliding vehicle door rather than a pivoting door to access the rear cabin. Sliding vehicle doors are generally mounted on one or more roller tracks that are attached to a vehicle body. The sliding vehicle door generally moves between a closed position and a fully open position. Sliding vehicle doors can thus provide a much larger area for the ingress and egress of passengers and other cargo from the rear cabin.

Sliding vehicle doors do present a variety of design challenges, however. For example, sliding vehicle doors are often heavier than their pivoting door counterparts. In addition, the center of gravity of the sliding vehicle door will move rearward relative to the sliding vehicle door's support arrangement as the sliding vehicle door moves to the fully open position. As a result, moving a sliding vehicle door from a closed position outward and rearward to the fully open position requires more strength than children, senior citizens and persons who are physically limited can muster. The same difficulties are experienced when moving the sliding vehicle door from the fully open position back to the closed position. Of course, when the vehicle is on hilly or uneven terrain, the problems associated with the opening and closing of the sliding vehicle door will be magnified.

To address this issue, wire track assemblies have been developed to provide continuous electrical power between the sliding vehicle door and vehicle body as opposed to merely linking the sliding vehicle door and the vehicle body through mechanical means. Specifically, the wire track assembly can provide direct and uninterrupted electrical communication both to and from the sliding vehicle door and the vehicle body. As a result, electrical devices such as motors and sensors can be mounted on or in the sliding vehicle door.

When in the closed position, the sliding vehicle door sits in a generally flush position relative to the vehicle body. Consequently, when opening the sliding vehicle door, the sliding vehicle door's rear edge must first pivot outward and rearward relative to the vehicle body. Only then can the sliding vehicle door move in a generally horizontal direction on the roller track(s) to the fully open position. Accordingly, the one or more roller tracks are non-linear.

In other words, the sliding vehicle door must move through an arcuate roller travel path along the roller track(s) from the closed position to the fully open position and back again to the closed position. Of course, the integrity of the electrical connection between the sliding vehicle door and vehicle body has to be maintained notwithstanding the non-linear movement of the sliding vehicle door.

Providing a continuous electrical link between a sliding vehicle door and the vehicle body also presents several design challenges. A wiring harness comprising a plurality of wires is disposed in and extends through the wire track assembly. The plurality of wires in the wiring harness are prone to failing as a result of repeated bending as the sliding vehicle door is opened and closed repeatedly for many duty cycles. Cold weather operation further reduces the longevity of the wires in the wiring harness. In addition, wire track assemblies that articulate outwardly away from the vehicle body as the sliding vehicle door is opened are left exposed when the sliding vehicle door is moved to the fully open position. Such wire track assemblies are therefore left exposed and relatively unprotected from damage that can be caused by passenger ingress and egress. Accordingly, wire track assemblies and their associated wiring harnesses are among the highest volume warranty replacement items on vans and mini-vans. For this reasons, there remains a need for improved wire track assemblies.

SUMMARY

This section provides a general summary of the disclosure, and is not a comprehensive disclosure of its full scope or all of its features.

In accordance with one aspect, the subject disclosure provides for a track assembly for a sliding vehicle door. The track assembly includes a wire track extending between a track mount assembly and a body mount component. The track mount assembly is configured to attach to the vehicle sliding door. The body mount component is disposed along the wire track opposite the track mount assembly. The wire track comprises a plurality of interconnected links that allow the wire track to articulate in a wire track articulation plane between a door closed position and a door open position. Each of the plurality of interconnected links, the body mount component, and the track mount assembly have a hollow center section cooperatively forming a wire routing cavity that extends through the wire track. A wiring harness is disposed in and extends through the wire routing cavity of the wire track. A grommet made of an elastomeric material is attached to and extends from the track mount assembly. The grommet surrounds the wiring harness while permitting the wiring harness to twist and bend inside the grommet as the wire track articulates between the door closed position and the door open position.

In accordance with another aspect of the subject disclosure, the track assembly includes a roller track that is positioned adjacent to and above a vehicle door sill. The roller track extends between a forward track end and a rear track end. The roller track includes a sidewall and a lower wall. The lower wall extends outwardly from the sidewall towards the sliding vehicle door. The sidewall and the lower wall of the roller track cooperatively define a roller receiving channel. The roller receiving channel defines a roller travel path that extends between the forward track end and the rear track end. A roller support arm extends between the roller track and the sliding vehicle door. A roller is rotatably supported on the roller support arm and is disposed within the roller receiving channel. The roller is configured to move along the roller track between the forward track end and the rear track end as the sliding vehicle door is opened and closed. The body mount component of the wire track is disposed adjacent the roller track. The body mount component of the wire track is mounted below the roller track such that the wire track articulation plane is disposed below the lower wall of the wire track and such that the wire track is positioned below the roller support arm as the wire track articulates within the wire track articulation plane between the door closed position and the door open position.

Advantageously, the disclosed wire track assembly greatly improves the service life of the wiring harness, including in cold weather climates. The disclosed wire track is also mounted below the roller support arm such that it is more protected for damage caused by passenger ingress and egress. Additionally, the position of the wire track assembly below the roller support arm places the wire track assembly out of view, which provides an aesthetic improvement over exposed wire track assemblies.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
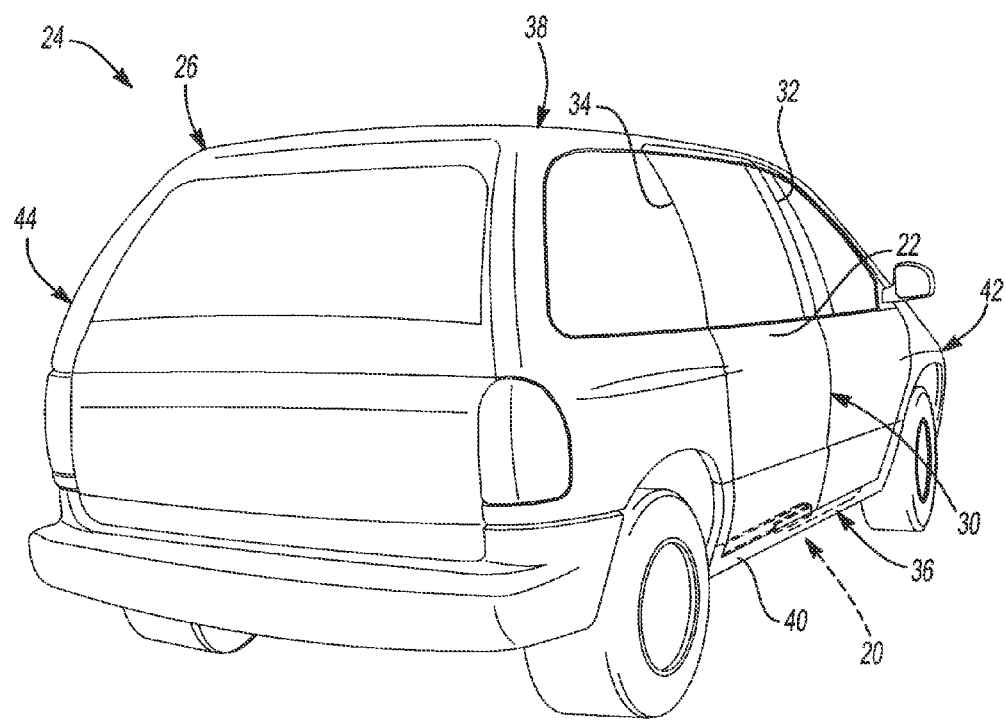
FIG. 1 is a rear perspective view of an exemplary vehicle that is equipped with a sliding vehicle door.

Referring to the Figures, wherein like numerals indicate corresponding parts throughout the several views, a track assembly 20 for a sliding vehicle door 22 is illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. The term "substantially parallel," as used herein, means that the recited elements are exactly parallel or are arranged at an angle ranging between and including plus or minus 5 degrees.

With reference to FIGS. 1-4, it should be appreciated that the track assembly 20 disclosed herein is a sub-assembly of a vehicle 24. By way of non-limiting example, the vehicle 24 may be an automobile such as a full-size van or a minivan. The vehicle 24 has a vehicle body 26 with associated vehicle body structure 28. The sliding vehicle door 22 is slidably mounted to the vehicle body structure 28 such that the sliding vehicle door 22 is moveable relative to the vehicle body 26. The vehicle body 26 has a sliding door opening 30 positioned longitudinally between a first body pillar 32 and a second body pillar 34 and vertically between a floor 36 and a roof 38 of the vehicle 24. The sliding door opening 30 is bounded by a vehicle door sill 40 that extends along the vehicle body structure 28 between the first and second body pillars 32, 34 at a location adjacent the floor 36 of the vehicle 24. The vehicle 24 has a front end 42 and a rear end 44, where the first body pillar 32 is positioned closer to the front end 42 of the vehicle 24 than the second body pillar 34 and the second body pillar 34 is positioned closer to the rear end 44 of the vehicle 24 than the first body pillar 32. The sliding door opening 30 in the vehicle body 26 receives the sliding vehicle door 22 when the sliding vehicle door 22 is slid closed. The sliding vehicle door 22 is slidably mounted on and supported by a roller track 46 that is connected to the vehicle body structure 28. The roller track 46 is mounted to the vehicle body structure 28 and is disposed adjacent to and above the vehicle door sill 40. In other words, the roller track 46 is positioned near the floor 36 of the vehicle 24. An additional roller track 46 (not shown) may also be provided adjacent the roof 38 of the vehicle 24. The additional roller track 46 can help to stabilize the sliding vehicle door 22 as the sliding vehicle door 22 is opened and slid out and away from the sliding door opening 30 towards the rear end 44 of the vehicle 24.

The roller track 46 extends between a forward track end 48 and a rear track end 50. The forward track end 48 is disposed adjacent the first body pillar 32 and the rear track end 50 is disposed adjacent the second body pillar 34. The roller track 46 has a sidewall 52, a lower wall 54, and an upper wall 56. The lower wall 54 of the roller track 46 extends outwardly from the sidewall 52 towards the sliding vehicle door 22. The upper wall 56 extends outwardly from the sidewall 52 towards the sliding vehicle door 22 at a position disposed above the lower wall 54. Accordingly, the upper and lower walls 56, 54 of the roller track 46 are vertically spaced from one another. The sidewall 52, the lower wall 54, and the upper wall 56 of the roller track 46 are integral with one another such that the roller track 46 defines a roller receiving channel 58 disposed beside the sidewall 52 and between the upper and lower walls 56, 54. The roller receiving channel 58 defines a roller travel path 60 that extends within the roller receiving channel 58 between the forward track end 48 and the rear track end 50. Accordingly, the roller travel path 60 is disposed within the roller receiving channel 58.

Figure 4:
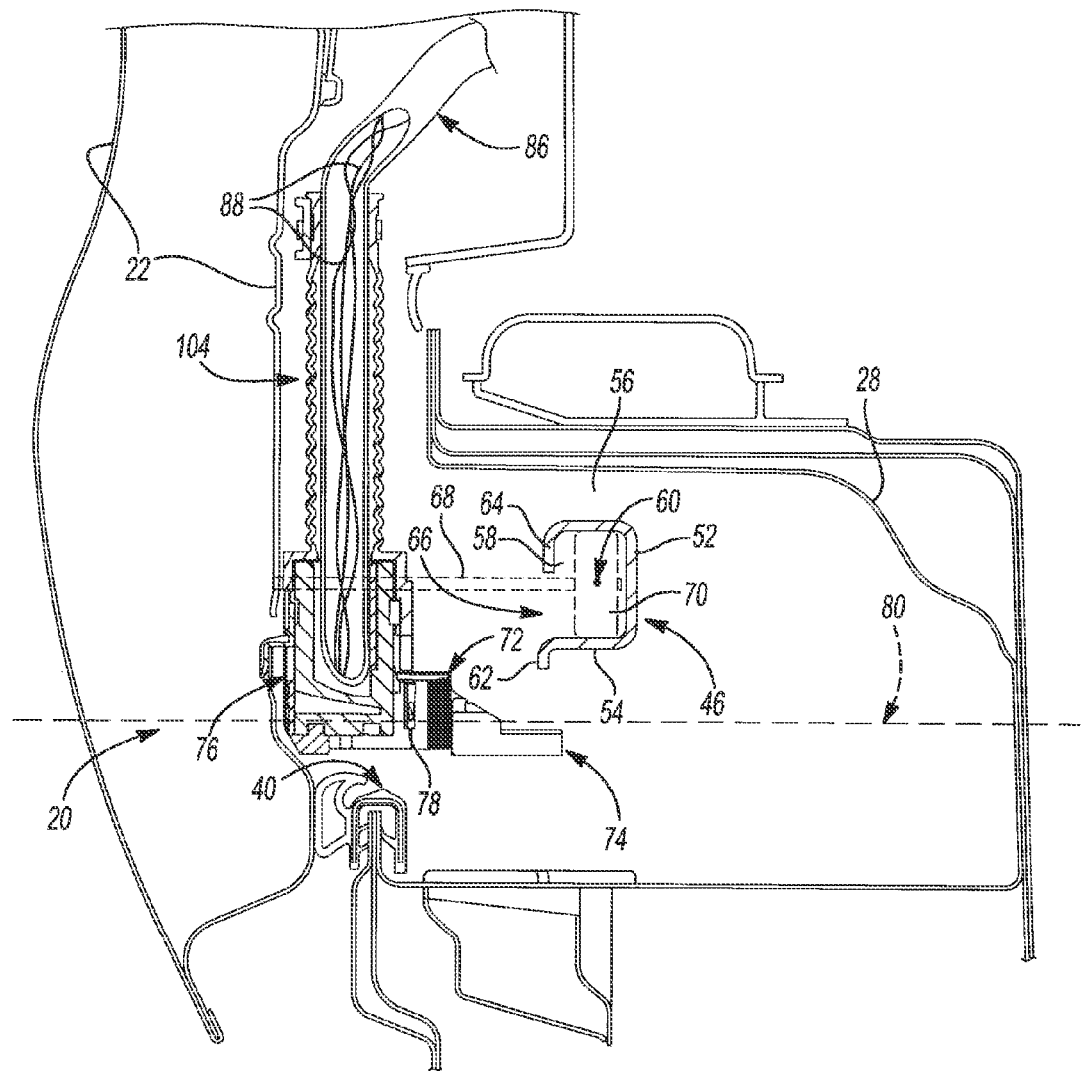
FIG. 4 is a front cross-sectional view of the exemplary track assembly of FIG. 2 that is taken along section line 4-4 in FIG. 2.

As best seen in FIG. 4, the roller track 46 has a C-shaped cross-section when the roller track 46 viewed from a point disposed along the roller travel path 60. The roller track 46 may additionally include a first downwardly depending wall 62 and a second downwardly depending wall 64. The first downwardly depending wall 62 extends from the lower wall 54 opposite the sidewall 52 and the second downwardly depending wall 64 extends from the upper wall 56 opposite the sidewall 52. The first and second downwardly depending walls 62, 64 extend substantially parallel to the sidewall 52 and are spaced apart from one another to define a channel opening 66 therebetween. The channel opening 66 is in communication with the roller receiving channel 58 of the roller track 46 and therefore provides access to the roller receiving channel 58.

Figure 2:
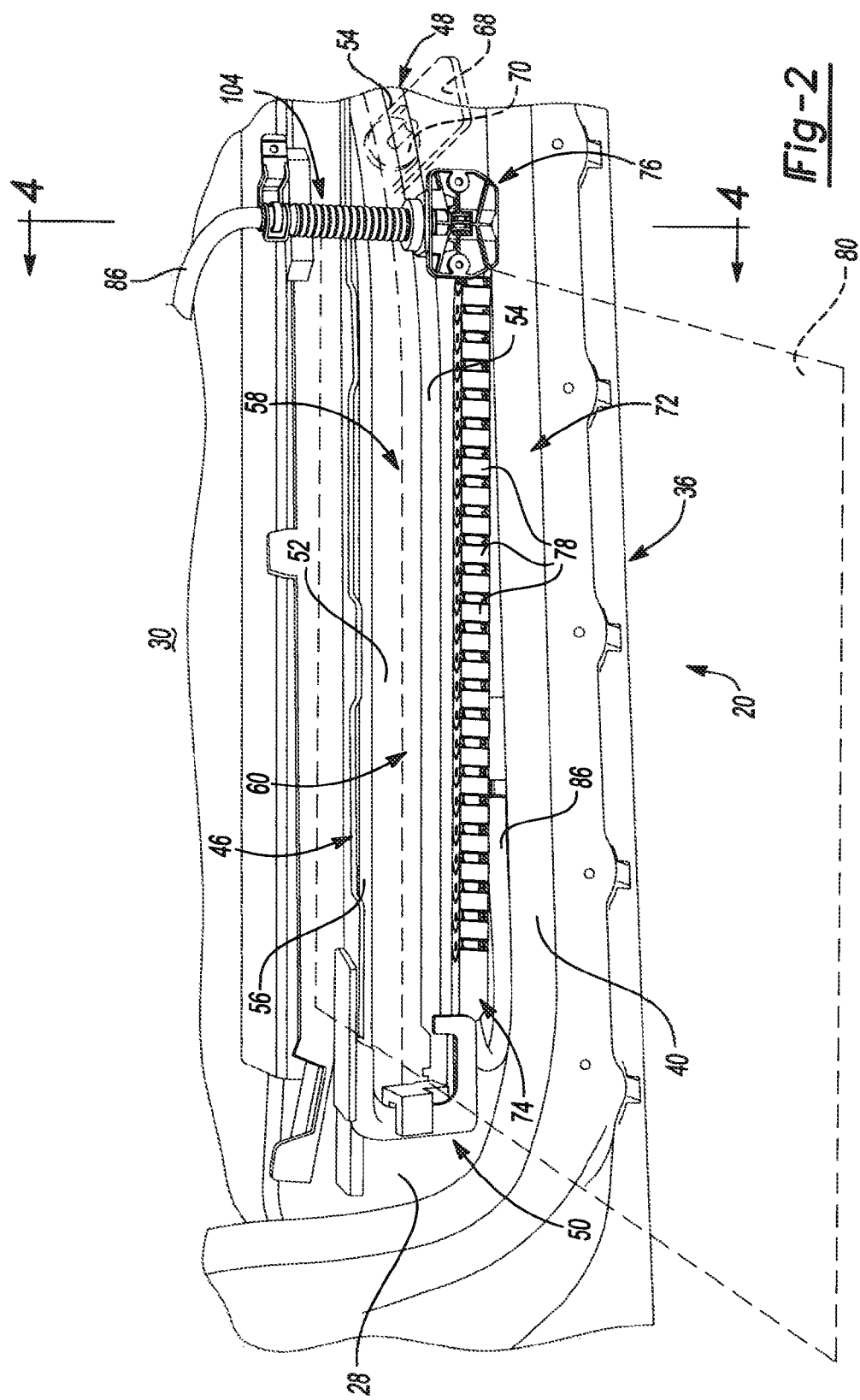
FIG. 2 is a side perspective view of an exemplary track assembly for the sliding vehicle door where the track assembly has been constructed in accordance with the subject disclosure and includes a wire track shown in a door closed position.
Figure 3:
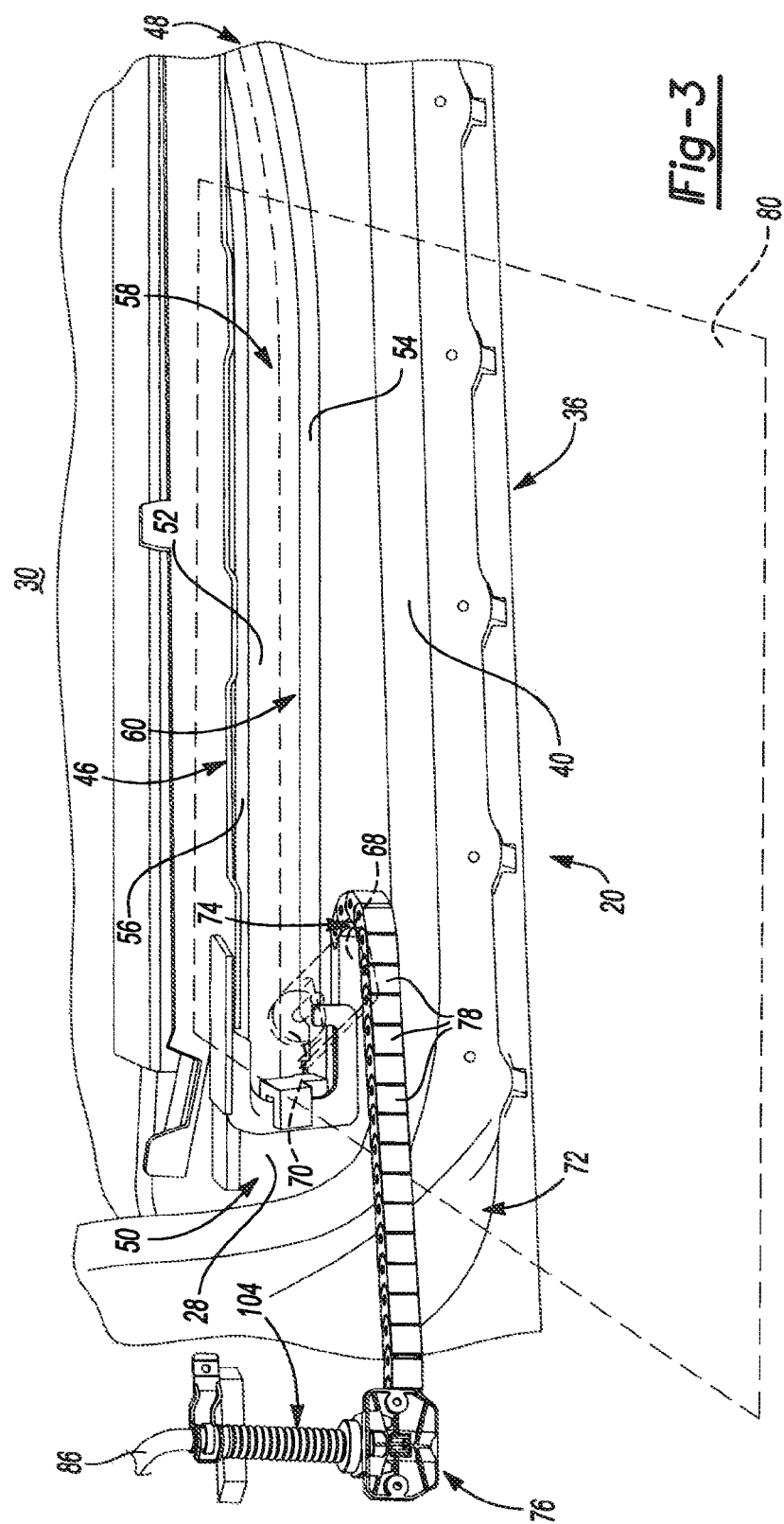
FIG. 3 is another side perspective view of the exemplary track assembly of FIG. 2 where the wire track is illustrated in a door open position.

With reference to FIGS. 2-4, a roller support arm 68 extends transversely relative to the roller track 46 between the roller track 46 and the sliding vehicle door 22. The roller support arm 68 is fixedly attached to the sliding vehicle door 22 and translates therewith as the sliding vehicle door 22 is opened and closed. A roller 70 is rotatably supported on the roller support arm 68. The roller 70 is disposed within the roller receiving channel 58 for movement along the roller track 46. Generally, the roller 70 moves along the roller travel path 60 from the forward track end 48 to the rear track end 50 as the sliding vehicle door 22 is opened and moves from the rear track end 50 to the forward track end 48 as the sliding vehicle door 22 is closed. In accordance with the illustrated embodiment, the roller 70 is positioned in the roller receiving channel 58 of the roller track 46 adjacent to the forward track end 48 when the sliding vehicle door 22 is closed and the roller 70 is positioned in the roller receiving channel 58 of the roller track 46 adjacent to the rear track end 50 when the sliding vehicle door 22 is fully and completely opened. It should also be appreciated that the roller travel path 60 may be curved or bent along at least a portion of the roller track 46 disposed adjacent the forward track end 48. As the sliding vehicle door 22 is initially slid open and the roller 70 moves away from the forward track end 48, the door first moves outwardly away from the vehicle body 26 and therefore pops out from the sliding door opening 30. Then the sliding vehicle door 22 may move substantially parallel to the vehicle body 26 as the roller 70 moves toward the rear track end 50, the portion of the roller track 46 that is curved or bent provides the non-linear movement of the sliding vehicle door 22 described above. Of course many variations are possible. By way of non-limiting example, other geometries for the roller track 46 may be used and the roller 70 in the illustrated embodiment may be replaced by a plurality of rollers (not shown) that are disposed in rolling contact with the roller track 46.

A wire track 72 extends between a body mount component 74 disposed adjacent the roller track 46 and a track mount assembly 76 that is attached to the vehicle 24 sliding door. The wire track 72 comprises of a plurality of interconnected links 78 that allow the wire track 72 to articulate in a wire track articulation plane 80 between a door closed position (shown in FIG. 2) and a door open position (shown in FIG. 3). Therefore, in the illustrated embodiment, the roller 70 is positioned in the roller receiving channel 58 of the roller track 46 adjacent to the forward track end 48 when the wire track 72 is in the door closed position and the roller 70 is positioned in the roller receiving channel 58 of the roller track 46 adjacent to the rear track end 50 when the wire track 72 is in the door opened position. The wire track articulation plane 80 is transverse to the sidewall 52 of the roller track 46 and is substantially parallel to the roller support arm 68. Although the geometry of the wire track 72 may vary, in the exemplary configuration shown in FIGS. 2-4, the wire track 72 extends linearly from the body mount component 74 to the track mount assembly 76 when the wire track 72 is in the door closed position and the wire track 72 is bent in the wire track articulation plane 80 when the wire track 72 is in the door closed position.

As shown in FIGS. 2-4, the body mount component 74 is fixedly attached to the vehicle body structure 28 at a location positioned above the vehicle door sill 40, below the lower wall 54 of the roller track 46, and adjacent the rear track end 50 of the roller track 46. Accordingly, the wire track 72 is positioned below the roller support arm 68 as the wire track 72 articulates within the wire track articulation plane 80 between the door closed position and the door open position. This location of the body mount component 74 places the wire track 72 and thus the wire track articulation plane 80 below the lower wall 54 of the roller track 46 and below the roller support arm 68 and provides packaging, appearance, and survivability benefits. Because the wire track 72 and the wire track articulation plane 80 are positioned below the lower wall 54 of the roller track 46, the wire track 72 can be configured to nest beneath the lower wall 54 of the roller track 46 in the door closed position. This arrangement of the roller track 46 and the wire track 72 can provide packaging benefits in the form of space savings where the vehicle door sill 40 and the roller support arm 68 can be made to have a smaller width (as measured in a direction transverse to the sidewall 52 of the roller track 46). Because the wire track 72 and the wire track articulation plane 80 are positioned below the roller support arm 68, the roller support arm 68 at least partially obscures the wire track 72 from view when the wire track 72 is in the door open position. This is advantageous from an appearance standpoint and also increases the survivability of the wire track 72 because the roller support arm 68 help protect the wire track 72 from becoming kicked or otherwise damaged during passenger ingress and egress through the sliding door opening 30. As shown in FIGS. 2-4, a portion of the wire track 72 may be positioned laterally between the first downwardly depending wall 62 of the roller track 46 and the sliding vehicle door 22. Notwithstanding this arrangement, it should be appreciated that both the wire track 72 and the wire track articulation plane 80 are still positioned below the lower wall 54 of the roller track 46.

Each and every link of the plurality of interconnected links 78 in the wire track 72 may be configured to permit articulation in only a single articulation direction as the wire track 72 bends away from the door closed position. The single articulation direction is defined by the wire track 72 bending outwardly away from the roller track 46 as the wire track 72 moves from the door closed position to the door open position. In other words, the construction of the plurality of interconnected links 78 prevents the wire track 72 from bending in any other direction besides the single articulation direction shown in FIG. 3. As a result, the wire track 72 is less prone to jamming when the wire track 72 initially pivots away from the door closed position.

Figure 5:
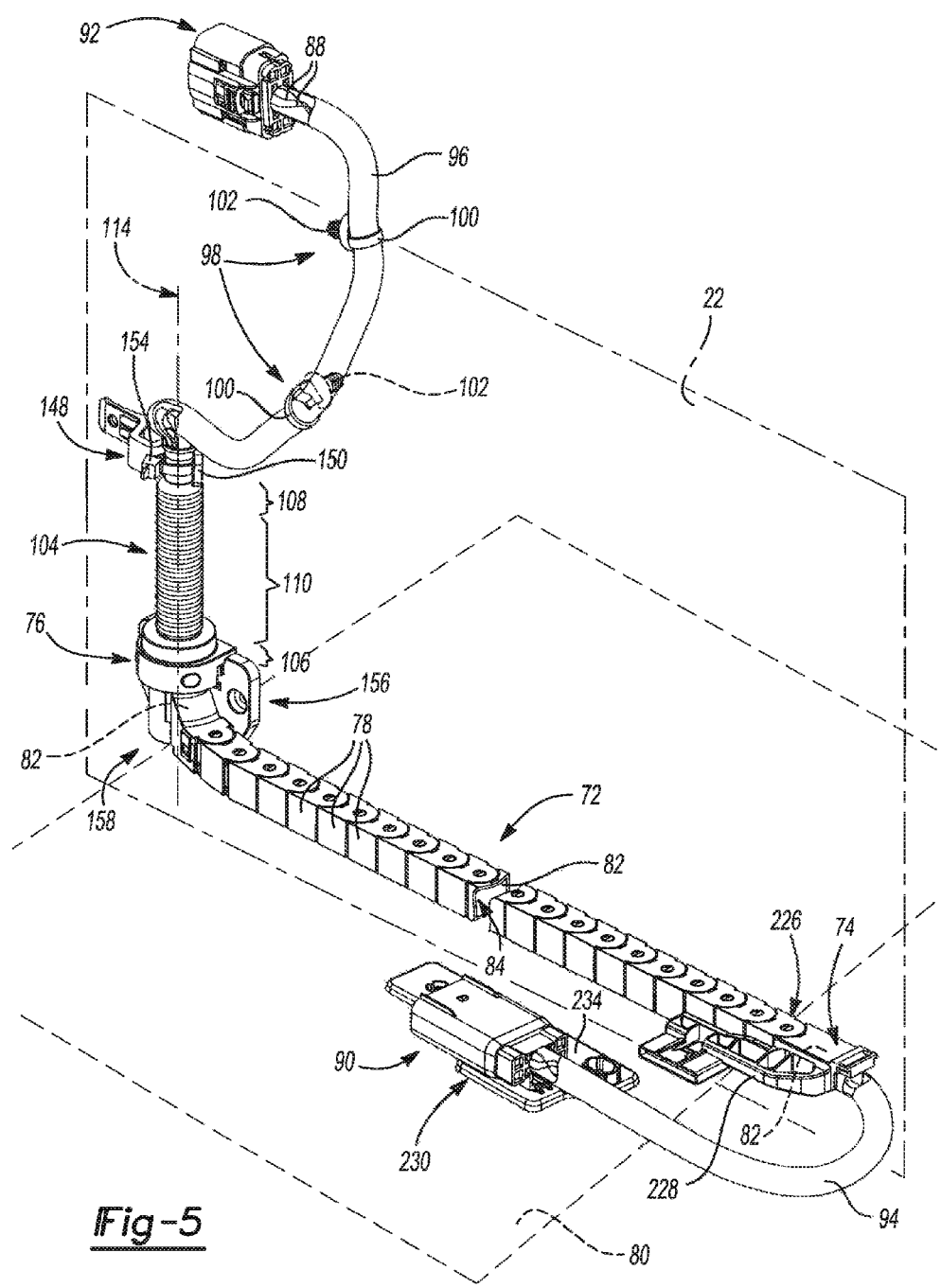
FIG. 5 is a side perspective view of the wire track, grommet, and wiring harness of the exemplary track assembly of FIG. 2.
Figure 6:
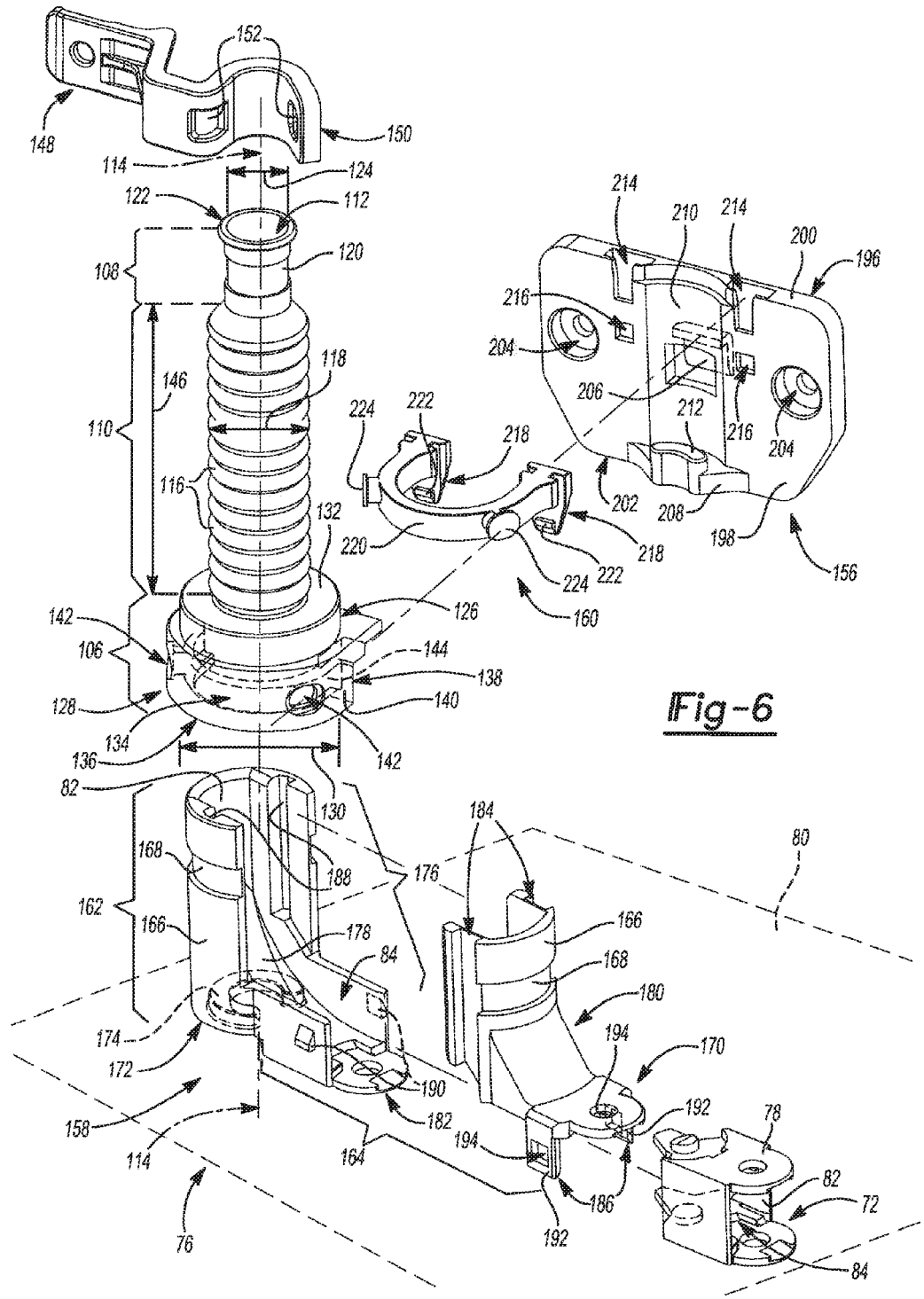
FIG. 6 is an exploded perspective view of the grommet and a track mount assembly and grommet of the wire track illustrated in FIG. 5.

Referring to FIGS. 5 and 6, each of the plurality of interconnected links 78, the body mount component 74, and the track mount assembly 76 have a hollow center section 82. The hollow center section 82 of the plurality of interconnected links 78, the body mount component 74, and the track mount assembly 76 cooperatively form a wire routing cavity 84 that extends through the wire track 72. A wiring harness 86 is disposed in and extends through the wire routing cavity 84 of the wire track 72. The wiring harness 86 includes a plurality of wires 88 that extend between a body side in-line connector 90 and a door side in-line connector 92. It should be appreciated that the wiring harness 86 provides electricity to the sliding vehicle door 22 and/or can communicate electronic signals between the sliding vehicle door 22 and the vehicle 24. As such, the body side in-line connector 90 is configured to connect to a corresponding connector disposed adjacent the vehicle body structure 28 and the door side in-line connector 92 is configured to connect to another corresponding connector disposed adjacent the sliding vehicle door 22. Optionally, a body side wiring sleeve 94 may be disposed about the plurality of wires 88 of the wiring harness 86 adjacent the body side in-line connector 90 and a door side wiring sleeve 96 may be disposed about the plurality of wires 88 of the wiring harness 86 adjacent the door side in-line connector 92. Thus, the body side wiring sleeve 94 is positioned between the body side in-line connector 90 and the body mount component 74, holding the plurality of wires 88 together at this location and protecting the plurality of wires 88 from cutting, abrasion, and short circuiting. The door side wiring sleeve 96 is positioned between the door side in-line connector 92 and the track mount assembly 76, holding the plurality of wires 88 together at this location and protecting the plurality of wires 88 from cutting, abrasion, and short circuiting.

One or more wire supports 98 may optionally be disposed along the wiring harness 86 at locations positioned between the door side in-line connector 92 and the track mount assembly 76. The wire supports 98 secure the wiring harness 86 to the sliding vehicle door 22. As shown in FIG. 5, the wire supports 98 include a wire tie portion 100 extending about the plurality of wires 88 and the door side wiring sleeve 96 and a Christmas tree fastener portion 102 projecting from the wire tie portion 100 to engage the sliding vehicle door 22. It should be appreciated that the structure of such Christmas tree fasteners is well known and therefore will not be detailed herein. Moreover, it should be appreciated that the Christmas tree fastener portion 102 of the wire support 98 may be replaced with other known fastener structures.

As shown in FIGS. 2-6, a grommet 104 is attached to and extends from the track mount assembly 76. The grommet 104 is made of an elastomeric material such that the grommet 104 can easily bend and stretch. It should be appreciated that the term "elastomeric material," as used herein means a material having weak inter-molecular forces such that the material exhibits viscoelasticity. By way of non-limiting example, the elastomeric material of the grommet 104 may be a synthetic or natural rubber. The grommet 104 is generally tubular in shape and surrounds the plurality of wires 88 of the wiring harness 86 while permitting the plurality of wires 88 to twist and bend inside the grommet 104 as the wire track 72 articulates between the door closed position and the door open position.

With reference to FIGS. 5 and 6, the grommet 104 generally has a boot portion 106, a neck portion 108, and a ribbed portion 110. The ribbed portion 110 is disposed between the boot portion 106 and the neck portion 108 of the grommet 104. The grommet 104 has an internal passageway 112 that extends through the grommet 104. The internal passageway 112 is open at the boot portion 106 and the neck portion 108 of the grommet 104 such that the internal passageway 112 may be described as extending entirely through the grommet 104. The grommet 104 also extends along and therefore defines a primary axis 114 that is transverse to the wire track articulation plane 80. The ribbed portion 110 of the grommet 104 has a plurality of annularly extending bellows 116 that allow the ribbed portion 110 of the grommet 104 to bend and stretch more easily. The ribbed portion 110 of the grommet 104 also has a ribbed portion internal diameter 118 that is measurable across one of the plurality of bellows 116 in a direction that is transverse to the primary axis 114. The neck portion 108 of the grommet 104 has a smooth outer clamping surface 120, an annular lip 122 opposite the ribbed portion 110, and a neck portion internal diameter 124 that is smaller than the ribbed portion internal diameter 118. The neck portion internal diameter 124 is also measurable in a direction that is transverse to the primary axis 114. The boot portion 106 has an upper region 126 adjacent the ribbed portion 110 and a lower region 128 opposite the ribbed portion 110. The upper region 126 is cylindrical in shape and defines a boot portion internal diameter 130 that is larger than the ribbed portion internal diameter 118. The boot portion internal diameter 130 is measurable in a direction that is transverse to the primary axis 114. The lower region 128 includes a transverse flange 132 that is connected to the upper region 126 of the boot portion 106 and a lower skirt 134 depending downwardly from the transverse flange 132. The transverse flange 132 of the boot portion 106 may be arranged substantially parallel to the wire track articulation plane 80 and the lower skirt 134 extends from the transverse flange 132 in a semi-circular arc 136. The lower skirt 134 of the boot portion 106 includes an interior skirt face 138, an exterior skirt face 140 opposite the interior skirt face 138, and one of more apertures 142 extending through the lower skirt 134 between the interior and exterior skirt faces 138, 140. The interior skirt face 138 includes a collar receiving channel 144 and the one or more apertures 142 in the lower skirt 134 open into the collar receiving channel 144.

The ribbed portion 110 of the grommet 104 extends along a pre-determined distance 146 that is measurable between the neck portion 108 and the upper region 126 of the boot portion 106 along the primary axis 114. The pre-determined distance 146 of the ribbed portion 110 ranges from 75 millimeters (mm) to 150 millimeters (mm), which has been found to provide sufficient room for the plurality of wires 88 in the wiring harness 86 to twist and bend within the ribbed portion 110 of the grommet 104. As such, the grommet 104 may be taller than the track mount assembly 76. Extensive testing was conducted to arrive at the above referenced range for the pre-determined distance 146 of the ribbed portion 110 of the grommet 104. Testing has shown that the disclosed wire track 72 could undergo 96,000 cycles (where the wire track 72 is moved from the door closed position to the door open position and back to the door closed position for each cycle) without failing when equipped with a grommet 104 sized within the above referenced range. Low temperature testing also revealed that the disclosed wire track 72 could undergo 15,000 cycles at minus 40 degrees Fahrenheit (−40° F.) without failing when equipped with a grommet 104 sized within the above referenced range.

With continued reference to FIGS. 5 and 6, a grommet bracket 148 may be provided to secure the neck portion 108 of the grommet 104 to the sliding vehicle door 22. The grommet bracket 148 is fixed to the sliding vehicle door 22 and includes a curved end 150 that contacts the smooth outer clamping surface 120 of the neck portion 108 of the grommet 104. The curved end 150 includes a pair of slots 152. The pair of slots 152 receives a tie strap 154 that extends about the smooth outer clamping surface 120 of the neck portion 108 of the grommet 104. The tie strap 154 secures the neck portion 108 of the grommet 104 to the grommet bracket 148 and thus the sliding vehicle door 22. Therefore, the neck portion 108 of the grommet 104 is held to the sliding vehicle door 22 such that the neck portion 108 of the grommet 104 does not move, bend, or rotate relative to the grommet bracket 148 or the sliding vehicle door 22.

The track mount assembly 76 generally includes a mounting plate 156, an elbow 158, and a collar 160. The mounting plate 156 is configured to be secured to the sliding vehicle door 22. The elbow 158 is rotatably coupled to the mounting plate 156 and the collar 160 extends about and retains the elbow 158 on the mounting plate 156. The elbow 158 generally has an L-shaped profile and includes an upright portion 162 and a foot portion 164. The upright portion 162 of the elbow 158 extends co-axially with the primary axis 114 into the upper region 126 of the grommet 104. Notwithstanding, it should be appreciated that the upright portion 162 of the elbow 158 and the primary axis 114 may or may not be vertically oriented. The foot portion 164 of the elbow 158 extends laterally from the upright portion 162 in the wire track articulation plane 80. The upright portion 162 of the elbow 158 includes an outer surface 166 having a collar receiving recess 168 that extends about the upright portion 162 of the elbow 158 and radially inwardly into the upright portion 162 of the elbow 158 from the outer surface 166.

The foot portion 164 of the elbow 158 terminates at a first coupling 170 that pivotally couples the elbow 158 to one of the plurality of interconnected links 78 of the wire track 72. The foot portion 164 of the elbow 158 also defines a bottom surface 172 of the elbow 158 that includes a projection receiving recess 174. The projection receiving recess 174 extends annularly along the bottom surface 172 of the elbow 158 in a semi-circular shape. The projection receiving recess 174 is disposed inwardly of and is spaced from the outer surface 166 of the upright portion 162 of the elbow 158. The hollow center section 82 of the track mount assembly 76 extends through the upright portion 162 and the foot portion 164 of the elbow 158. The wire routing cavity 84 includes a transition section 176 adjacent the hollow center section 82 of the track mount assembly 76 where the wire routing cavity 84 gradually changes direction from extending primarily along the primary axis 114 to extending primarily within the wire track articulation plane 80. The elbow 158 includes a curved internal face 178 that at least partially defines the transition section 176 of the wire routing cavity 84.

Although the elbow 158 may be constructed in numerous ways, the elbow 158 illustrated in FIGS. 5 and 6 includes a first clamshell component 180 and a second clamshell component 182 that together cooperate to form the elbow 158. The first clamshell component 180 and the second clamshell component 182 are detachably coupled by a tongue and groove connection 184 and a snap connection 186. The tongue and groove connection 184 is disposed along the upright portion 162 adjacent the wire routing cavity 84 and includes grooves 188 that extend parallel to the primary axis 114. The snap connection 186 is disposed along the foot portion 164 and includes one or more ramps 190 and one or more snap arms 192 with each of the snap arms 192 having a window 194 disposed therein. The window 194 in each one of the snap arms 192 receives one of the ramps 190 as the first and second clamshells are brought together. The ramps 190 engage (i.e. snap into) the windows 194 such as to prevent inadvertent separation of the first and second clamshells. Alternatively and without limitation, the elbow 158 may be constructed as a single piece.

The mounting plate 156 of the track mount assembly 76 has a generally planar shape and includes a posterior surface 196 that abuts the sliding vehicle door 22, an anterior surface 198 opposite the posterior surface 196, an upper end 200 disposed adjacent to and contacting the boot portion 106 of the grommet 104, and a lower end 202 opposite the upper end 200. The mounting plate 156 may also include a pair of mounting bores 204 that extend through the mounting plate 156 from the posterior surface 196 to the anterior surface 198. The pair of mounting bores 204 receive fasteners (not shown) for securing the mounting plate 156 to the sliding vehicle door 22. The mounting plate 156 may additionally include a clip 206 projecting from the posterior surface 196 for securing the mounting plate 156 to the sliding vehicle door 22. A shoulder 208 extends outwardly from and transverse to the anterior surface 198 of the mounting plate 156 adjacent the lower end 202. The anterior surface 198 of the mounting plate 156 has a contoured face 210 that receives part of the upright portion 162 of the elbow 158 such that the contoured face 210 of the anterior surface 198 of the mounting plate 156 abuts the outer surface 166 of the upright portion 162 of the elbow 158. The shoulder 208 of the mounting plate 156 contacts and supports part of the bottom surface 172 of the foot portion 164 of the elbow 158. The shoulder 208 of the mounting plate 156 also includes a projection 212 that extends into the projection receiving recess 174 in the bottom surface 172 of the elbow 158. Accordingly, the projection 212 may or may not extend in a direction that is parallel to the primary axis 114. Because the projection 212 extends into and is received by the projection receiving recess 174, the projection 212 secures the foot portion 164 of the elbow 158 to the lower end 202 of the mounting plate 156 while permitting limited rotation of the elbow 158 relative to the mounting plate 156. Specifically, the elbow 158 is permitted to rotate approximately 180 degrees relative to the mounting plate 156 where contact between the foot portion 164 of the elbow 158 and the anterior surface 198 of the mounting plate 156 prevents further rotation of the elbow 158 relative to the mounting plate 156. As shown in FIG. 6, the projection 212 has a curved shape that follows the semi-circular shape of the projection receiving recess 174.

The collar 160 is attached to and extends from the mounting plate 156. Although other arrangements are possible, in the illustrated embodiment, the collar 160 is detachably coupled to the mounting plate 156. With reference to FIG. 6, the mounting plate 156 includes a pair of collar slots 214 that extend inwardly into the mounting plate 156 from the upper end 200 of the mounting plate 156 toward the lower end 202 of the mounting plate 156. The collar slots 214 are open to the anterior surface 198 of the mounting plate 156 adjacent the upper end 200 and the mounting plate 156 has a pair of holes 216 that extend from the anterior surface 198 to the pair of collar slots 214. The collar 160 is detachably coupled to the mounting plate 156 by a pair of legs 218 that are received in the pair of collar slots 214 in the mounting plate 156. The collar 160 has a bridge portion 220 extends between the pair of legs 218 that has a semi-circular shape. Each of the pair of legs 218 is transverse to and extends from the bridge portion 220 and terminates in a wedged tip 222. The wedged tips 222 of the pair of legs 218 engage (i.e. snap into) the pair of holes 216 in the mounting plate 156 when the collar 160 is installed on the mounting plate 156. The bridge portion 220 of the collar 160 is partially disposed in the collar receiving recess 168 on the outer surface 166 of the upright portion 162 of the elbow 158 to secure the upright portion 162 of the elbow 158 to the upper end 200 of the mounting plate 156 while permitting limited rotation of the elbow 158 relative to the mounting plate 156. The bridge portion 220 of the collar 160 is also partially disposed in the collar receiving channel 144 in the lower skirt 134 of the boot portion 106 of the grommet 104. The boot portion 106 of the grommet 104 is attached to the collar 160, which is attached to the mounting plate 156 and thus the sliding vehicle door 22, such that the boot portion 106 of the grommet 104 does not bend, translate, or rotate relative to the sliding vehicle door 22. The grommet 104 may be detachably coupled to the collar 160 by one or more studs 224 that extends from the bridge portion 220 of the collar 160 and into the one or more apertures 142 in the lower skirt 134 of the grommet 104. In this way, the boot portion 106 of the grommet 104 may be easily disconnected from the collar 160 for disassembly of the track assembly 20 or to inspect the plurality of wires 88 in the wiring harness 86.

With reference to FIG. 5, the body mount component 74 includes a second coupling 226 that pivotally couples the body mount to one of the plurality of interconnected links 78 of the wire track 72. A mounting arm 228 attaches the body mount component 74 to the vehicle body structure 28 at a location adjacent and below the rear track end 50. The mounting arm 228 of the body mount component 74 extends partially along one side of the wire track 72 to act as a stop that prevents the wire track 72 from articulating inwardly toward the roller track 46 as the sliding vehicle door 22 is moved away from the door closed position. A connector plate 230 attaches the body side in-line connector 90 to the vehicle body structure 28 at a location below the wire track 72. The connector plate 230 is generally planar in shape and includes a finger that stands above a top side 234 of the connector plate 230. The body side in-line connector 90 includes a slotted box that slidingly engages the finger of the connector plate 230 to detachably couple the body side in-line connector 90 to the connector plate 230.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A track assembly for a sliding vehicle door comprising:
    a wire track extending between a track mount assembly that is configured to attach to the vehicle sliding door and a body mount component;
    said wire track comprising a plurality of interconnected links that allow said wire track to articulate in a wire track articulation plane between a door closed position of said wire track and a door open position of said wire track;
    each of said plurality of interconnected links, said body mount component, and said track mount assembly having a hollow center section cooperatively forming a wire routing cavity that extends through said wire track;
    a wiring harness disposed in and extending through said wire routing cavity of said wire track; and
    a grommet made of an elastomeric material attached to and extending from said track mount assembly, said grommet surrounding said wiring harness while permitting said wiring harness to twist and bend inside said grommet as said wire track articulates between said door closed position and said door open position,
    wherein said track mount assembly includes a mounting plate, an elbow rotatably coupled to said mounting plate such that said elbow is permitted to rotate relative to said mounting plate, and a collar that extends about and retains said elbow on said mounting plate, said collar being separate from and mounted to said mounting plate such that said collar remains stationary with respect to said mounting plate, and
    wherein said grommet is directly mounted on said collar such that said grommet does not rotate relative to said mounting plate.

2. The track assembly as set forth in claim 1 wherein said grommet has a tubular shape and includes a boot portion, a neck portion, and a ribbed portion that is disposed between said boot portion and said neck portion.

3. The track assembly as set forth in claim 2 wherein said neck portion of said grommet has an outer clamping surface and an annular lip.

4. The track assembly as set forth in claim 3 further comprising:
    a grommet bracket that is configured to attach said neck portion of said grommet to the sliding vehicle door, said grommet bracket including a curved end that contacts said outer clamping surface, said curved end including a pair of slots, said pair of slots receiving a tie strap that extends about said outer clamping surface of said neck portion of said grommet and secures said neck portion of said grommet to said grommet bracket.

5. The track assembly as set forth in claim 2 wherein said grommet has an internal passageway that extends through said grommet and defines a primary axis, said internal passageway being open at said boot portion and said neck portion of said grommet, and said primary axis being transverse to said wire track articulation plane.

6. The track assembly as set forth in claim 5 wherein said boot portion is cylindrical in shape and includes a transverse flange and a lower skirt depending downwardly from said transverse flange, said lower skirt extending in a semi-circular arc, said lower skirt of said boot portion including an interior skirt face, an exterior skirt face opposite said interior skirt face, and at least one aperture extending through said lower skirt between said interior and exterior skirt faces, said interior skirt face including a collar receiving channel, and said at least one aperture opening into said collar receiving channel.

7. The track assembly as set forth in claim 6 wherein said elbow of said track mount assembly includes an upright portion and a foot portion, said upright portion extending co-axially with said primary axis into said boot portion of said grommet, and said foot portion extending laterally from said upright portion in said wire track articulation plane.

8. The track assembly as set forth in claim 7 wherein said upright portion of said elbow includes an outer surface having a collar receiving recess that extends about said upright portion and wherein said collar is at least partially disposed in said collar receiving recess to secure said upright portion of said elbow to said mounting plate while permitting limited rotation of said elbow relative to said mounting plate.

9. The track assembly as set forth in claim 8 wherein said foot portion of said elbow terminates at a first coupling that pivotally couples said elbow to one of said plurality of interconnected links of said wire track, said foot portion of said elbow defining a bottom surface of said elbow that includes a projection receiving recess that extends in said bottom surface of said elbow in a semi-circular shape, said projection receiving recess being spaced from said outer surface of said upright portion of said elbow, said wire routing cavity extending through said upright portion and said foot portion of said elbow, said elbow including a transition section where said wire routing cavity changes direction from along said primary axis to along said wire track articulation plane, and said elbow including a curved internal face at least partially defining said wire routing cavity along said transition section.

10. The track assembly as set forth in claim 9 wherein said mounting plate includes a posterior surface that is configured to abut the sliding vehicle door, an anterior surface opposite said posterior surface, an upper end disposed adjacent to and contacting said boot portion of said grommet, a lower end opposite said upper end, and a shoulder extending outwardly from and transverse to said anterior surface of said mounting plate, said anterior surface of said mounting plate having a contoured face that receives at least part of said upright portion of said elbow such that said contoured face of said anterior surface of said mounting plate abuts said outer surface of said upright portion of said elbow, said shoulder of said mounting plate contacting and supporting at least part of said bottom surface of said foot portion of said elbow, and said shoulder of said mounting plate including a projection extending into said projection receiving recess in said bottom surface to secure said foot portion of said elbow to said lower end of said mounting plate while permitting limited rotation of said elbow relative to said mounting plate.

11. The track assembly as set forth in claim 6 wherein said collar is partially disposed in said collar receiving channel and wherein said grommet is detachably coupled to said collar by at least one stud that extends from said collar and into said at least one aperture in said lower skirt of said grommet.

12. The track assembly as set forth in claim 5 wherein said ribbed portion of said grommet extends a pre-determined distance ranging from 75 millimeters to 150 millimeters, said pre-determined distance being measurable between said neck portion and said boot portion along said primary axis.

13. A track assembly for a sliding door of a vehicle comprising:
a roller track positioned adjacent to and above a door sill of the vehicle, said roller track extending between a forward track end and a rear track end;
said roller track including a sidewall and a lower wall extending away from said sidewall towards the sliding vehicle door, said sidewall and said lower wall defining a roller receiving channel;
said roller receiving channel defining a roller travel path that extends between said forward track end and said rear track end;
a roller support arm extending between said roller track and the sliding vehicle door;
a roller rotatably supported by said roller support arm, said roller having a horizontally extending axis of rotation, said roller disposed within said roller receiving channel for movement along said roller track between said forward track end and said rear track end as the sliding vehicle door is opened and closed, said lower wall of said roller track contacting and supporting said roller as said roller moves along said roller track between said forward track end and said rear track end;
a wire track extending between a body mount component disposed adjacent said roller track and a track mount assembly that is configured to attach to the vehicle sliding door, said wire track comprising a plurality of interconnected links that allow said wire track to articulate in a wire track articulation plane between a door closed position of said wire track and a door open position of said wire track;
each of said plurality of interconnected links, said body mount component, and said track mount assembly having a hollow center section cooperatively forming a wire routing cavity;
a wiring harness disposed in and extending through said wire routing cavity; and
said body mount component being mounted below said lower wall of said roller track such that said wire track articulation plane is disposed below said lower wall of said roller track and such that said wire track is positioned below said roller support arm as said wire track articulates within said wire track articulation plane between said door closed position and said door open position.

14. The track assembly as set forth in claim 13 wherein each of said plurality of interconnected links in said wire track is configured to permit articulation of said wire track in only a single articulation direction when said wire track moves from said door closed position to said door open position, said single articulation direction being defined by said wire track bending outwardly away from said roller track.

15. The track assembly as set forth in claim 13 wherein said body mount component is configured to be fixedly attached to a body structure of the vehicle at a position located between said rear track end of said roller track and the vehicle door sill.

16. The track assembly as set forth in claim 15 wherein said roller track includes a downwardly depending wall extending from said lower wall, said downwardly depending wall extending substantially parallel to said sidewall, and said wire track being positioned between said downwardly depending wall of said roller track and the sliding vehicle door.

17. The track assembly as set forth in claim 13 wherein said roller support arm is fixedly attached to the sliding vehicle door.

18. The track assembly as set forth in claim 13 wherein said wire track extends generally linearly from said body mount component to said track mount assembly when said wire track is in said door closed position and said wire track being bent in said wire track articulation plane when said wire track is in said door open position.

* * * * *